United States Patent [19]
Collins

[11] Patent Number: 5,957,281
[45] Date of Patent: *Sep. 28, 1999

[54] PACKAGE FOR RETAINING BOTH COMPACT DISCS AND COMPUTER DISCS

[76] Inventor: William Collins, 30 Durham Rd., New Hyde Park, N.Y. 11040

[*] Notice: This patent is subject to a terminal disclaimer.

[21] Appl. No.: 09/034,135

[22] Filed: Feb. 27, 1998

Related U.S. Application Data

[63] Continuation-in-part of application No. 08/576,497, Dec. 21, 1995, Pat. No. 5,749,463, and a continuation-in-part of application No. 08/607,647, Feb. 27, 1996, Pat. No. 5,769,216.

[51] Int. Cl.$^6$ ............................................. B65D 85/57
[52] U.S. Cl. ............................ 206/307.1; 206/308.1; 206/308.3
[58] Field of Search ....................... 206/308.1, 308.3, 206/307.1, 312, 313

[56] References Cited

U.S. PATENT DOCUMENTS

| | | |
|---|---|---|
| 2,189,076 | 2/1940 | Liskin . |
| 2,827,223 | 3/1958 | Allison . |
| 3,112,825 | 12/1963 | Ullger . |
| 3,245,691 | 4/1966 | Gorman . |
| 3,595,383 | 7/1971 | Boylan . |
| 4,488,645 | 12/1984 | Yamaguchi . |
| 4,566,590 | 1/1986 | Manning et al. . |
| 4,653,639 | 3/1987 | Traynor . |
| 4,805,770 | 2/1989 | Grobecker et al. . |
| 4,850,731 | 7/1989 | Youngs . |
| 4,993,552 | 2/1991 | Bugbey et al. .................. 206/308.3 X |
| 5,048,681 | 9/1991 | Henkel . |
| 5,085,318 | 2/1992 | Leverick . |
| 5,101,973 | 4/1992 | Martinez . |
| 5,147,036 | 9/1992 | Jacobs . |
| 5,154,284 | 10/1992 | Starkey . |
| 5,188,229 | 2/1993 | Bernstein . |
| 5,207,717 | 5/1993 | Manning . |
| 5,248,032 | 9/1993 | Sheu et al. . |
| 5,255,785 | 10/1993 | Mackey . |
| 5,289,918 | 3/1994 | Dobias et al. . |
| 5,291,990 | 3/1994 | Sejzer . |
| 5,396,987 | 3/1995 | Temple et al. . |
| 5,460,265 | 10/1995 | Kiolbasa . |
| 5,506,740 | 4/1996 | Harmon . |
| 5,638,952 | 6/1997 | Kim ..................................... 206/307.1 |
| 5,749,463 | 5/1998 | Collins ................................ 206/308.1 |

FOREIGN PATENT DOCUMENTS

| | | |
|---|---|---|
| 5213387 | 8/1993 | Japan . |
| 8702565 | 5/1989 | Netherlands . |
| 94/22742 | 10/1994 | WIPO . |

*Primary Examiner*—Bryon P. Gehman
*Attorney, Agent, or Firm*—Frishauf, Holtz, Goodman, Langer & Chick, P.C.

[57] ABSTRACT

A package for retaining compact discs and computer discs includes a retention panel and a first folded sidewall section extending from the retention panel. The first folded sidewall section includes a first contour edge substantially corresponding to a periphery of the compact disc, and two first cut-out portions for accommodating insertion of two corners of the computer disc. The package also includes a second folded sidewall section extending from the retention panel. The second folded sidewall section includes a second contour edge substantially corresponding to a periphery of the compact disc for accommodating insertion of the compact disc between the first and second contour edges, and a cut-out portion substantially corresponding to a third corner of the computer disc for accommodating insertion of the third corner of the computer disc therein.

21 Claims, 3 Drawing Sheets

ས5,957,281

PACKAGE FOR RETAINING BOTH COMPACT DISCS AND COMPUTER DISCS

REFERENCE TO RELATED APPLICATIONS

The present application is a Continuation-In-Part of U.S. patent application Ser. No. 08/576,497 filed Dec. 21, 1995 entitled COMPACT DISC PACKAGE WITH SPINES, now U.S. Pat. No. 5,749,463 and is also a Continuation-In-Part of U.S. patent application Ser. No. 08/607,647 filed Feb. 27, 1996 entitled HOLDER FOR COMPACT DISC AND THE LIKE, now U.S. Pat. No. 5,769,216. The entire disclosure of each application is incorporated herein by reference.

BACKGROUND OF THE INVENTION

1. Field of the Invention

The present invention relates to a package, such as a holder or mailer, for retaining one or more compact discs (CD), one or more computer discs (i.e., computer "floppy" discs), or a combination of CDs and computer discs, securely for storage and/or transport without scratching or marring the playing surface of the CD and for permitting rapid removal of the CD and computer disc.

2. Description of the Related Art

Disc packages are traditionally designed to contain only either a compact disc (CD) or a computer disc, not both. Conventional, packages for retaining a CD have the potential of scratching or marring the playing surface of the compact disc. Since different packages are required for specific types of discs, increased costs are encountered when both a CD and computer disc need to be retained.

OBJECTS AND SUMMARY OF THE INVENTION

Accordingly, it is an object of the present invention to provide a package capable of simultaneously retaining both a compact disc and/or a computer disc.

It is another object of the present invention to provide a package for holding one or more compact discs, one or more computer discs, or a combination of compact discs and computer discs, securely for storage or transport.

It is a further object of the present invention to provide a package for retaining compact discs and/or computer discs which can be made of paperboard or the like with conventional folding equipment used in carton making.

It is yet another object of the present invention to provide an economical disc package capable of retaining both compact discs and/or computer discs, while also protecting the playing surface of the compact discs from being scratched or marred.

It is still another object of the present invention to provide a package which permits rapid insertion and removal of compact discs and computer discs.

It is yet a further object of the present invention to provide a disc package which is easy to use and which is economical to manufacture.

It is still a further object of the present invention which overcomes inherent disadvantages of known disc holders.

In accordance with one form of the present invention, a package for retaining a compact disc and/or a computer disc includes a retention panel and a first folded sidewall section extending from the retention panel. The first folded sidewall section includes a first contour edge substantially corresponding to the periphery of the compact disc, and at least one first cut-out portion for accommodating insertion of at least one corner of the computer disc. The package also includes a second folded sidewall section extending from the retention panel. The second folded sidewall section has a second contour edge substantially corresponding to a periphery of the compact disc for accommodating insertion of the compact disc between the first and second contour edges, and at least one second cut-out portion for accommodating insertion of at least one other corner of the computer disc.

In accordance with another form of the invention, a package for retaining a compact disc and/or a computer disc includes a retention panel and a first folded sidewall section extending from the retention panel. The first folded sidewall section includes a first contour edge substantially corresponding to a periphery of a compact disc, and at least one first cut-out portion for accommodating insertion of at least one corner of the computer disc. The package also includes a second folded sidewall section extending from the retention panel. The second folded sidewall section has a second contour edge substantially corresponding to the periphery of a compact disc for accommodating insertion of the compact disc between the first and second contour edges, and at least one second cut-out portion for accommodating insertion of the at least one other corner of the computer disc. The package also includes a front panel secured to the retention panel along a fold line to permit the front panel to fold over the first and second folded sidewall sections, a closure flap secured to the retention panel along another fold line to permit the closure flap to fold onto the front panel, and a fastener for fastening the closure flap into position on the front panel.

The above and other objects, features and advantages of the package for retaining both compact discs and computer discs will become readily apparent from the following detailed description of illustrative embodiments thereof, which is to be read in connection with the accompanying drawings.

DESCRIPTION OF THE PREFERRED EMBODIMENTS

Figure 1:
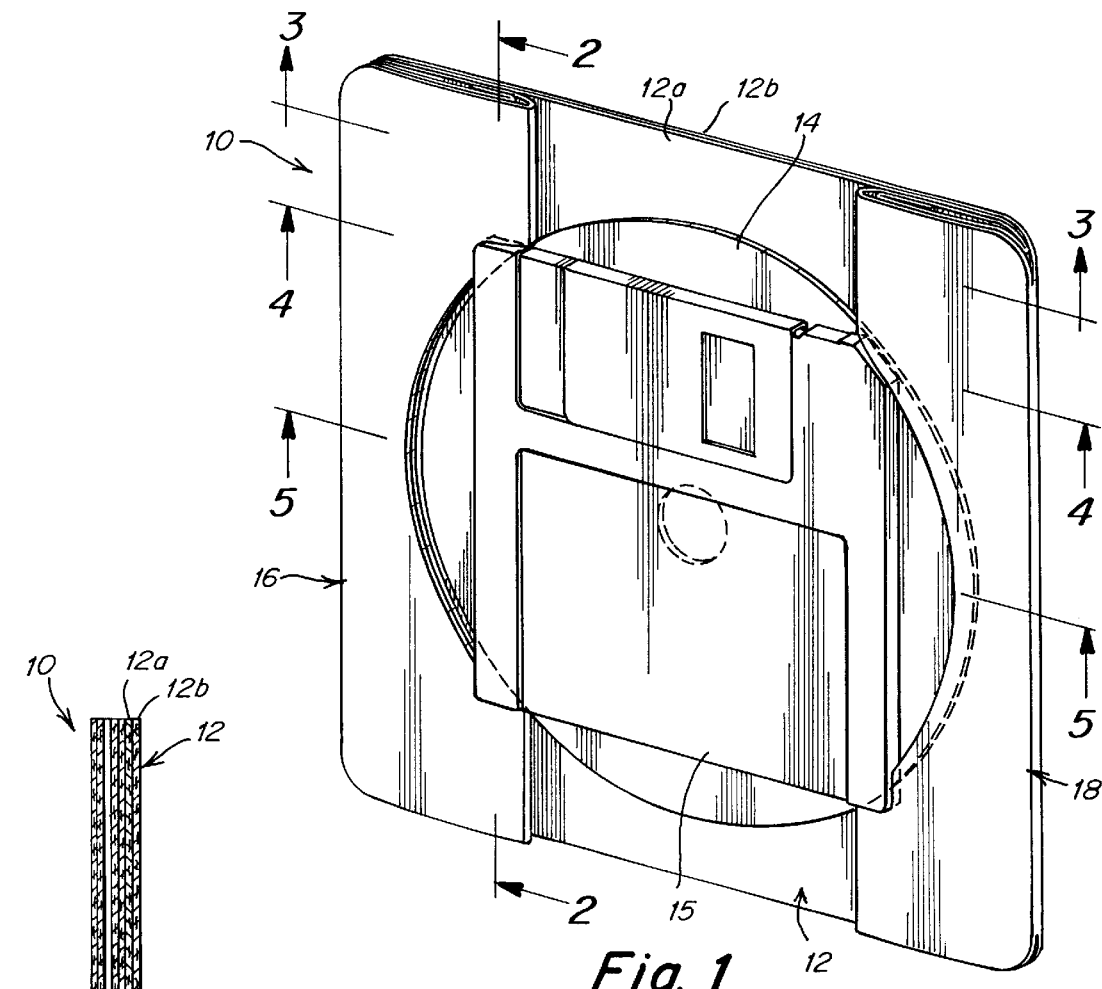
FIG. 1 is a perspective view of a package for retaining both compact discs and computer discs according to a first embodiment of the present invention.

Referring now to the drawings in detail, and initially to FIGS. 1–7 thereof, a package 10 for retaining both compact discs and computer discs according to a first embodiment of the present invention is shown. The package 10 is preferably made of paperboard (or the like) or other material than can be worked and formed with a conventional carton making machine. Specifically, package 10 includes a generally planar retention panel 12 in a first plane and against which a compact disc (CD) 14 can rest. In order to provide additional strength, retention panel 12 may comprise a two-ply thickness panel formed from an upper layer 12a and a lower layer 12b (see, for example, FIGS. 2 and 3).

In order to retain compact disc 14 and/or computer disc 15 in position on retention panel 12, first and second folded sidewall sections 16 and 18 are preferably formed on opposite (e.g., left and right) sides of retention panel 12. First and second folded sidewall sections 16 and 18 are formed from an extension of lower layer 12b, as best shown in FIG. 7, which, when in a folded condition, overlay upper layer 12a.

Figure 7:
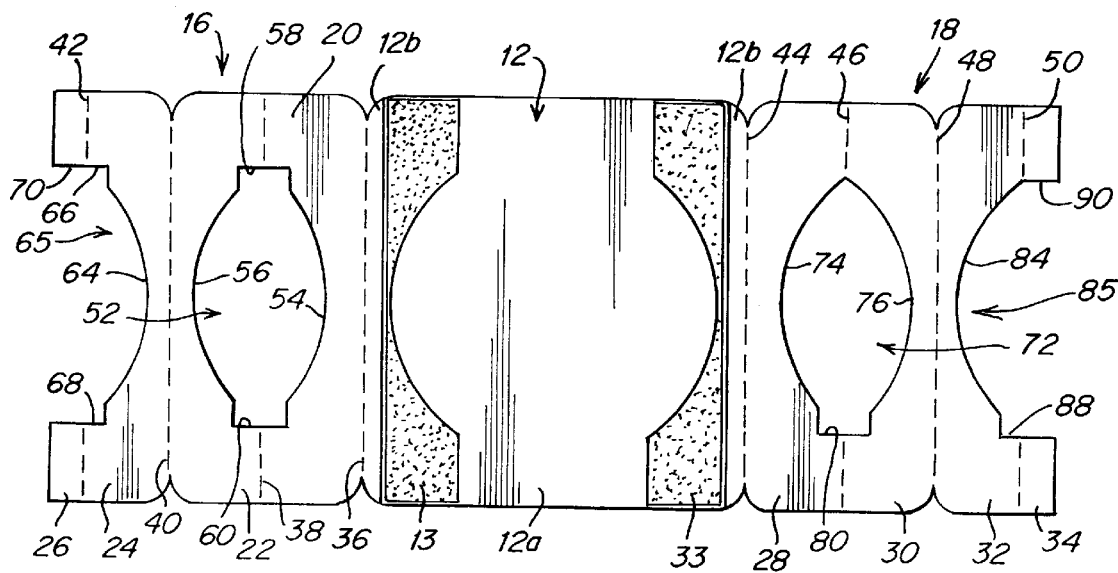
FIG. 7 is an unassembled plan view showing an unfolded blank from which the package of FIGS. 1 and 7 is constructed.

Referring now to FIG. 7, the first folded sidewall section 16 (left side of FIG. 7) includes panel sections 20, 22, 24 and 26 having fold (or score) lines therebetween, while second folded sidewall section 18 (right side of FIG. 7) includes panel sections 28, 30, 32 and 34 having fold (or score) lines therebetween. Specifically, the right edge of panel section 20 is coupled to the left edge of retention panel lower layer 12b by fold line 36 while the left edge of panel section 20 is coupled to the right edge of panel section 22 by fold line 38. The left edge of panel section 22 is coupled to the right edge of panel section 24 by fold line 40, and the left edge of panel section 24 is coupled to the right edge of panel section 26 by fold line 42.

Figures 2, 3:
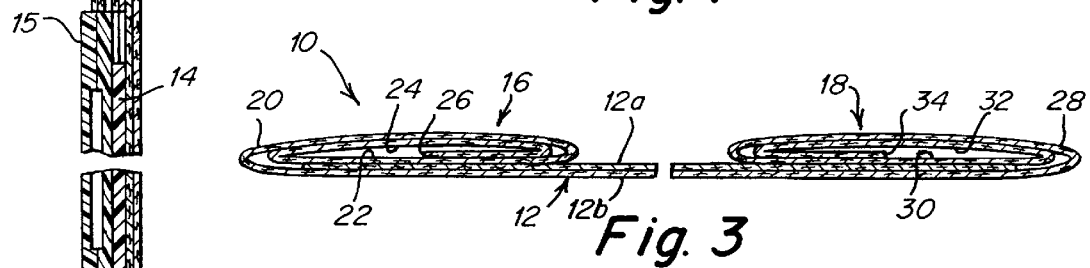
FIG. 2 is a cross-sectional view of the package of FIG. 1, taken along line 2—2 of FIG. 1.
FIG. 3 is a cross-sectional view of the package of FIG. 1, taken along line 3—3 of FIG. 1.
Figure 4:
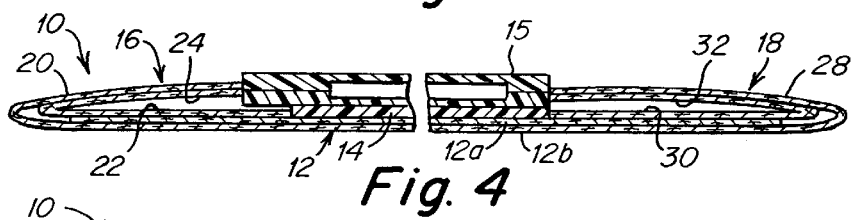
FIG. 4 is a cross-sectional view of the package of FIG. 1, taken along line 4—4 of FIG. 1.
Figure 5:
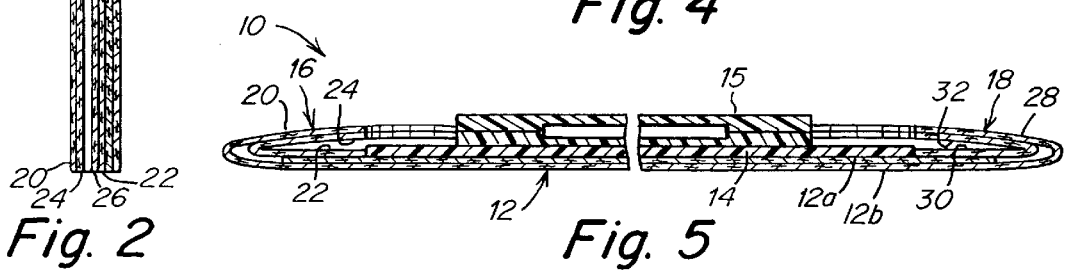
FIG. 5 is a cross-sectional view of the package of FIG. 1, taken along line 5—5 of FIG. 1.

With this just described arrangement, panel section 26 is folded about fold line 42 onto panel section 24. Then, panel section 24 is folded about fold line 40 so that panel sections 24 and 26 overlay panel section 22. Thereafter, panel section 22 is folded about fold line 38 so that panel sections 22, 24 and 26 overlay panel section 20, and panel section 20 is folded about fold line 36 so that panel sections 20, 22, 24 and 26 overlay the left side of retention panel upper layer 12a. In such case, the sections overlay retention panel upper layer 12a in the order of panels 22, 26, 24 and 20, as shown in FIG. 3.

Figure 6:
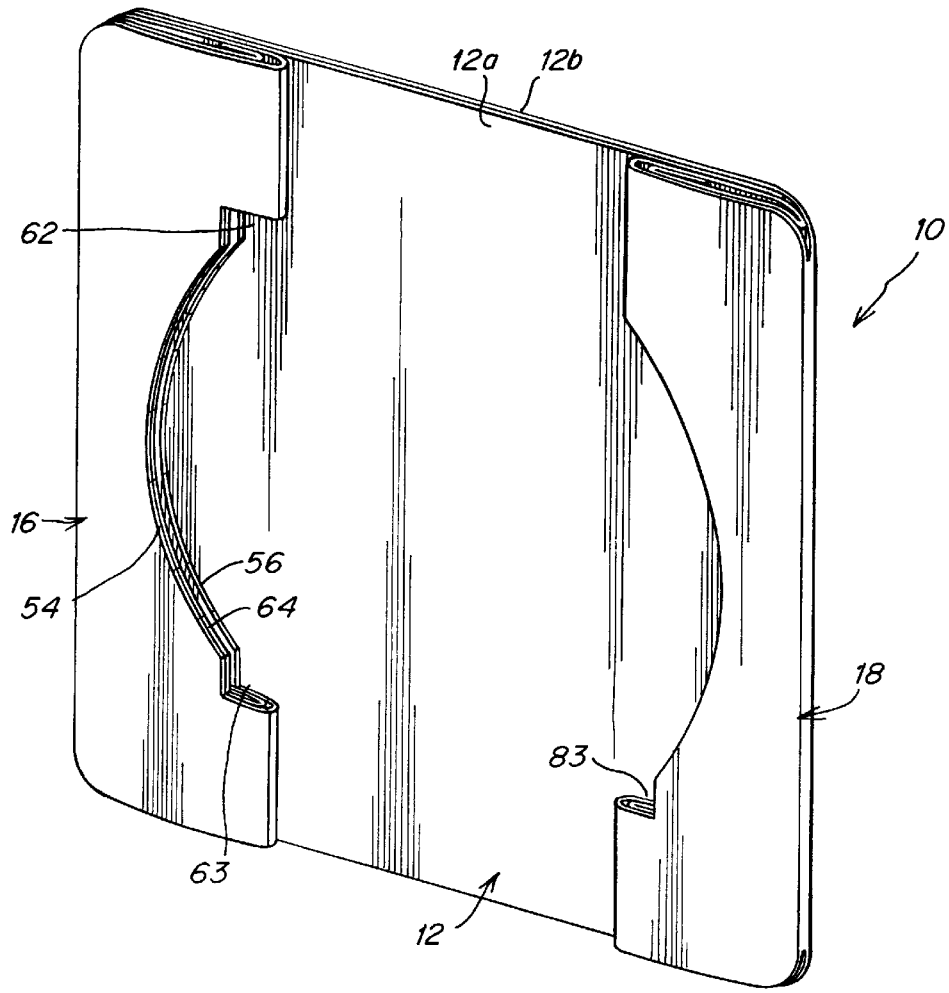
FIG. 6 is a perspective view of the package for retaining both compact discs and computer discs without either a compact disc or computer disc being held therein.

Panel 22 is the lowermost panel. Panel 22 is preferably adhered to the upper surface of retention panel upper layer 12a by an adhesive 13 (FIG. 7) applied to the side edge of rear retention panel 12 so that the adhesive will contact the folded over panel 22. The adhesive is preferably of sufficient strength to keep the folded sections 20, 22, 24 and 26 in a folded condition as shown in FIG. 6. In lieu of an adhesive, other suitable forms of fastening may be employed, for example, stapling or engageable hook and loop material. Adhesive, however, is preferred.

In like manner, the left edge of panel section 28 is coupled to the right edge of retention panel 12 by fold line 44 while the right edge of panel section 28 is coupled to the left edge of panel section 30 by fold line 46. The right edge of panel section 30 is coupled to the left edge of panel section 32 by fold line 48, and the right edge of panel section 32 is coupled to the left edge of panel section 34 by fold line 50.

With this just described arrangement, panel section 34 is folded about fold line 50 onto panel section 32. Then panel section 32 is folded about fold line 48 so that panel sections 32 and 34 overlay panel section 30. Thereafter, panel section 30 is folded about fold line 46 so that panel sections 30, 32 and 34 overlay panel section 28, and panel section 28 is folded about fold line 44 so that panel sections 28, 30, 32 and 34 overlay the right side of retention panel 12. In such case, the sections overlay retention panel upper layer 12a in the order of panels 30, 34, 32 and 28, as shown in FIG. 3.

Since panel 30 is the lowermost panel, it is preferably adhered to the upper surface of retention panel upper layer 12a by an adhesive 33 (FIG. 7) applied to the side edge of rear retention panel 12 so that the adhesive will contact the folded over panel 30. The adhesive is preferably of sufficient strength to keep the folded sections 28, 30, 32 and 34 in a folded condition as shown in FIG. 6. In lieu of an adhesive, other suitable forms of fastening may be employed, for example, stapling or engageable hook and loop material. Adhesive, however, is preferred.

Accordingly, as shown in FIG. 6, left and right folded sidewall sections 16 and 18 respectively oppose and face each other and extend upwardly out of the plane of retention panel 12. The left and right folded sidewall sections 16 and 18 have a gap therebetween for holding compact and computer discs, as will be described in more detail.

Referring now to FIGS. 6 and 7, a first cut-out section 52 is formed in folded sidewall section 16 so as to span panel sections 20 and 22, and so as to be substantially centered about fold line 38. Cut-out section 52 has a substantial vase-like shape, with a first convex, part-circular contour edge 54 formed in panel section 20 and an opposite facing second convex, part-circular contour edge 56 formed in panel section 22. First cut-out section 52 also includes upper and lower substantially rectangular-like cut-out sections 58 and 60 which respectively connect upper and lower ends of contour edges 54 and 56. When panel section 22 is folded about fold line 38 so as to overlay panel section 20, contour edges 54 and 56 overlap, while rectangular cut-out sections 58 and 60 are each divided in half so as to present upper and lower L-shaped cut-out sections 62 and 63 of left folded sidewall section 16, as shown in FIG. 6.

In addition, panel section 24 has a cut-out section 65 which is substantially similar to cut-out section 52 in panel section 20, and thereby includes a third convex, part-circular contour edge 64 in panel section 24 facing in the same direction as contour edge 54. In addition, upper and lower substantially rectangular-like cut-out sections 66 and 68 are formed at upper and lower ends of contour edge 64, respectively. Cut-out sections 66 and 68 are preferably one-half the width of cut-out sections 58 and 60, so that they also form part of the L-shaped cut-out sections 62 and 63 of left folded sidewall section 16, as best shown in FIG. 6.

Panel section 26 has a cut-out section 70 which extends to the left edge thereof and for substantially the same height as rectangular cut-out sections 66 and 68 of panel section 24.

As will be appreciated from the discussion which follows, contour edges 56, 64 and 54 overlay one another (as shown in FIG. 6) and are adapted to frictionally engage the outer periphery of compact disc 14 to retain the compact disc in the package (FIG. 1), while L-shaped cut-out sections 62 and 63 (FIG. 6) are adapted to frictionally engage two outer corners of a computer disc 15 to retain the computer disc in the package (FIG. 1). Thus, the radius of curvature of contour edges 54, 56, and 64 are substantially the same and generally conform to the outer periphery of compact disc 14.

Referring now to the right side of FIG. 7 (and in like manner to that set forth above in connection with folded sidewall section 16), a first cut-out section 72 is formed in folded sidewall section 18 so as to span panel sections 28 and 30, and so as to be centered about fold line 46. Cut-out section 72 has a substantial vase-like shape, with a first convex, part-circular contour edge 74 in panel section 28 and an opposite facing second convex, part-circular contour edge 76 in panel section 30, with upper portions of contour edges 74 and 76 preferably meeting at a point on fold line 46. First cut-out section 72 also includes a lower substantially rectangular cut-out section 80 which couples lower ends of contour edges 74 and 76. When panel section 30 is folded about fold line 46 so as to overlay panel section 28, contour lines 74 and 76 overlap, while rectangular cut-out section 80 is divided in half so as to present a lower L-shaped cut-out section 83 of right folded sidewall section 18, as shown in FIG. 6.

In addition, panel section 32 has a cut-out section 85 substantially identical to the cut-out section 72 in panel section 28, and therefore includes a third convex, part-circular contour edge 84 in panel section 32 facing in the same direction as contour edge 74. The upper point of contour edge 84 terminates at a point on fold line 50. A lower substantially rectangular cut-out section 88 is formed at the lower end of contour edge 84. Cut-out section 88 is preferably one-half the width of cut-out section 80, so that it also forms part of the L-shaped cut-out section 83 of right folded sidewall section 18, as shown in FIG. 6.

Panel section 34 has a cut-out 90 at the center thereof, and which extends to the left edge thereof, with cut-out 90 extending to a height substantially equal to that between the upper edge of convex contour line 84 and rectangular cut-out section 88 of panel section 32.

As will be appreciated from the following discussion, contour edges 76, 84 and 74 overlay one another, and are adapted to frictionally engage the outer periphery of compact disc 14 to retain the compact disc in the package (FIG. 1), while L-shaped cut-out section 83 is adapted to frictionally engage an outer corner of a computer disc 15 to retain the computer disc in the package (FIG. 1). Thus, the radius of curvature of contour edges 74, 76, and 84 are substantially the same and generally conform to the outer periphery of compact disc 14.

It is foreseen that more than one compact disc 14 can be frictionally held between contour edges 54, 56 and 64 on the left side and contour edges 74, 76 and 84 on the right side. Since folded sidewall sections 16 and 18 are spaced from each other, gaps are provided therebetween at the upper and lower portions of package 10 in order for a compact disc 14 to be easily removed by engaging an edge thereof. Further, because of the plurality of layers of folded sidewall sections 16 and 18, a plurality of compact discs 14 can be superposed on each other, and held by the varied number of contour edges.

In addition, because of the depth of the three L-shaped cut-out sections 62, 63 and 83, more than one 3½" computer disc 15 can be frictionally retained. With such discs 15, the fourth corner of such disc 15 (that is, the cut-away or beveled corner) engages contour edges 74, 76 and 84 as shown in FIG. 1.

It will be appreciated that, because of the height of folded sidewall sections 16 and 18, and because of the different contour edges and L-shaped cut-out sections, a plurality of compact discs 14 can be held therein, a plurality of computer discs 15 can be held therein, or as shown in FIG. 1, both compact discs 14 and computer discs 15 can be held therein in superposed relation.

Since compact disc 14 and/or computer disc 15 are securely held in place with the folded sidewall sections 16 and 18 generally extending to a greater height, the playing surfaces of the compacts discs are protected from being scratched or marred. At the same time, package 10 permits rapid removal and full display of the entire face of the label side of the discs when the package is open.

Further, since package 10 is preferably made of paperboard or the like using conventional folding equipment used in carton making and the like, package 10 is easy to use and economical to manufacture.

Figure 8:
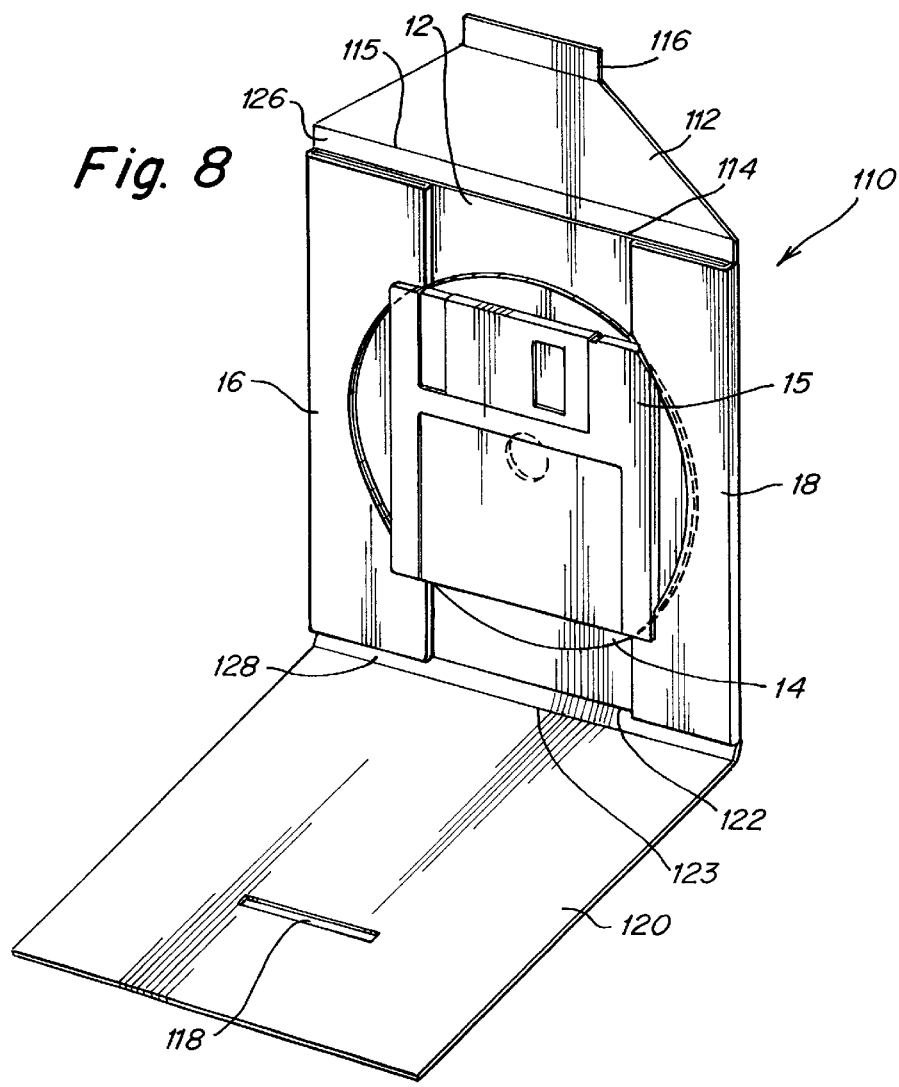
FIG. 8 is a perspective view of a package for retaining both compact discs and computer discs according to a second embodiment of the present invention, having a closable cover in its open position.
Figure 9:
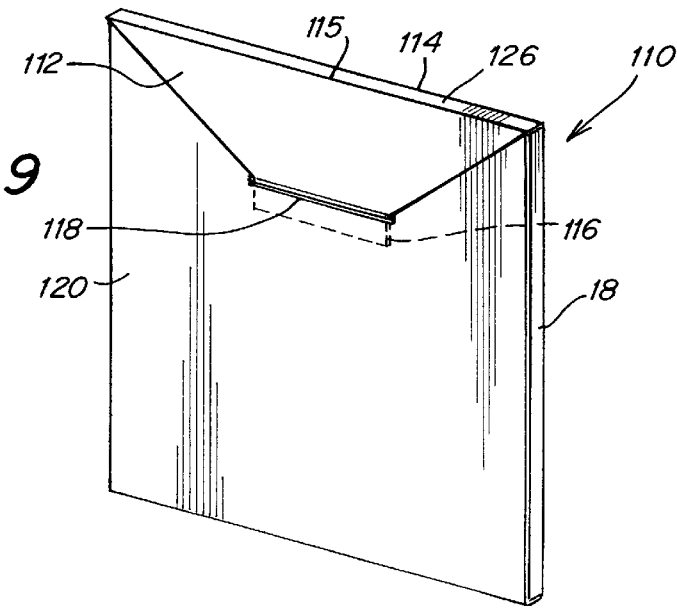
FIG. 9 is a perspective view of the package of FIG. 8, with the cover in its closed position.

Referring now to FIGS. 8 and 9, a package 110 according to a second embodiment of the present invention is shown which is also preferably made of paperboard or other material that can be worked and formed on a conventional carton making machine.

Package 110 is similar to package 10, and for brevity, only the differences therebetween will be discussed.

Specifically, package 110 preferably includes a trapezoidal shaped closure flap 112 coupled by parallel, spaced fold (or score) lines 114 and 115 to the upper edge of retention panel lower layer 12*b*. Closure flap 112 includes a reduced dimension rectangular tab 116 at the free end thereof, which is insertable into a slit 118 formed in a front panel 120 coupled by fold (or score) lines 122 and 123 to the lower edge of retention panel lower layer 12*b*. Fold lines 114, 115 and 122, 123 are spaced apart to provide spines 126 and 128, which enable flap 112 and front panel 120 to contact folded sidewall sections 16 and 18. As a result, the upper surface of the exposed disc 14 and/or computer disc 15 is protected by front panel 120. Front panel 120 may also include a pocket panel (not shown) therein, as described and shown in copending application Ser. No. 08/576,497.

In both of the above-described embodiments, the curved portions of the contour edges are closely contoured so as to correspond to the outer periphery of the compact disc so that when the compact disc is inserted, it is frictionally retained in position without inadvertently falling out of the package. It is also foreseen that tabs (not shown) may extend from the first and second contour edges to assist in retaining the compact disc and/or computer disc in the package as shown and described in copending application Ser. Nos. 08/576,497 and 08/607,647.

Having described specific preferred embodiments of the invention with reference to the accompanying drawings, it will be appreciated that the present invention is not limited to those precise embodiments and that various changes and modifications can be effected therein by one of ordinary skill in the art without departing from the scope or spirit of the invention defined by the appended claims.

What is claimed is:

1. A package for retaining at least one of a compact disc and a computer disc, comprising:

a retention panel having first and second surfaces;

a first folded sidewall section extending from said retention panel, said first folded sidewall section comprising:

a first contour edge substantially corresponding to a periphery of a compact disc; and at least one first cut-out portion substantially corresponding to at least a first corner of a computer disc for accommodating insertion of the at least first corner of the computer disc; and a second folded sidewall section extending from said retention panel, said second folded sidewall section comprising:

a second contour edge substantially corresponding to the periphery of the compact disc for accommodating insertion of the compact disc between said first and second contour edges; and at least one second cut-out portion substantially corresponding to at least a second corner of the computer disc for accommodating insertion of the at least second corner of the computer disc.

2. The package according to claim 1, wherein said first and second cut-out portions are respectively oriented on said first and second folded sidewall sections such that the compact disc and computer disc are in superposed relation when fixed in the package.

3. The package according to claim 2, wherein there are two said first cut-out portions and one said second cut-out portion corresponding to first, second and third corners of the computer disc, and when the computer disc is located in the package, a fourth corner of the computer disc engages said second contour edge.

4. The package according to claim 1, wherein said first and second contour edges are in spaced apart relation a sufficient distance to frictionally engage and retain the compact disc therebetween.

5. The package according to claim 1, wherein said at least one first and second cut-out portions are in spaced apart relation a sufficient distance to frictionally engage the computer disc therebetween.

6. The package according to claim 1, wherein each said folded sidewall section includes a plurality of panels coupled along side fold lines, with one of said plurality of panels being coupled along a main fold line to a side edge of said retention panel, with said plurality of panels being folded along said side fold lines so as to overlay each other and to overlay one side of said retention panel.

7. The package according to claim 6, wherein said plurality of panels are cut-out to define openings with curved edges.

8. The package according to claim 7, wherein said curved edges are in overlapping relation to define said first contour edge and said second contour edge.

9. The package according to claim 8, wherein said curved edges terminate in substantially rectangular opening portions which define said cut-out portions when said panels are in said overlapping relation.

10. The package according to claim 6, wherein there are at least three said panels of said plurality of panels connected to each side edge of said retention panel.

11. The package according to claim 1, wherein the first contour edge is in facing relation to the second contour edge.

12. The package according to claim 1, wherein the first and second folded sidewall sections are secured to respective first and second opposing sides of one of the first and second surfaces of the retention panel.

13. A package for retaining at least one of a compact disc and a computer disc, comprising;
a retention panel;
a first folded sidewall section extending from said retention panel, said first folded sidewall section comprising:
a first contour edge substantially corresponding to a periphery of a compact disc; and
at least one first cut-out portion substantially corresponding to at least a first corner of a computer disc for accommodating insertion of the at least first corner of the computer disc;
a second folded sidewall section extending from said retention panel, said second folded sidewall section including:
a second contour edge substantially corresponding to the periphery of the compact disc for accommodating insertion of the compact disc between said first and second contour edges; and
at least one second cut-out portion substantially corresponding to at least a second corner of the computer disc for accommodating insertion of the at least second corner of the computer disc in said at least one second cut-out portion;
a front panel secured to said retention panel along a fold line to permit said front panel to fold over said first and second folded sidewall sections;
a closure flap coupled to said retention panel along another fold line to permit said closure flap to fold onto said front panel; and
a fastener coupled to one of the front panel and closure flap for securing the front panel and closure flap together.

14. The package according to claim 13, wherein said fastener comprises a slit in said front panel and a tab on said closure flap, said tab being insertable within said slit for securing said closure flap to said front panel.

15. The package according to claim 13, wherein said first and second cut-out portions are oriented on said first and second folded sidewall sections such that the compact disc and computer disc are in superposed relation when fixed in the package.

16. The package according to claim 15, wherein there are two said first cut-out portions and one said second cut-out portion corresponding to first, second and third corners of the computer disc, and a fourth corner of said computer disc engages said second contour edge.

17. The package according to claim 13, wherein said first and second contour edges are in spaced apart relation a sufficient distance to frictionally engage and retain said compact disc therebetween, and the at least one first and second cut-out portions are in spaced apart relation a sufficient distance to frictionally engage and retain the computer disc therebetween.

18. The package according to claim 13, wherein said first and second folded sidewall sections comprise a plurality of panels coupled along side fold lines, with a first panel coupled along a main fold line to a side edge of said retention panel, with said panels being folded along said side fold lines so as to overlay each other and to overlay one side of said retention panel.

19. The package according to claim 18, wherein said plurality of panels are cut-out to define openings with curved edges, and said curved edges are in overlapping relation to define said first contour edge and said second contour edge.

20. The package according to claim 19, wherein said curved edges terminate in substantially rectangular opening portions which define said cut-out portions when said panels are in said overlying relation.

21. The package according to claim 18, wherein the plurality of panels comprise at least three said panels.

* * * * *